United States Patent [19]
McSherry et al.

[11] Patent Number: 5,236,293
[45] Date of Patent: Aug. 17, 1993

[54] ANCHOR ASSEMBLY FOR FASTENER

[75] Inventors: Thomas S. McSherry, Medford, N.Y.; Steven D. Townsend, Waterbury, Conn.

[73] Assignee: Titan Technology, Inc., Stamford, Conn.

[21] Appl. No.: 696,880

[22] Filed: May 8, 1991

[51] Int. Cl.⁵ .................. F16B 21/00; F16B 39/00
[52] U.S. Cl. .............................. 411/344; 411/258; 411/342; 29/525.1
[58] Field of Search .............. 411/21, 82, 258, 340, 411/342, 344, 345; 29/261, 525.1

[56] References Cited

U.S. PATENT DOCUMENTS

| | | |
|---|---|---|
| 608,717 | 8/1898 | Russel . |
| 1,623,789 | 4/1927 | Hubener . |
| 2,398,220 | 4/1946 | Gelpcke . |
| 2,565,391 | 8/1951 | Molat . |
| 2,578,515 | 12/1951 | Crafton ............... 411/340 |
| 2,733,629 | 2/1956 | Vogt .................. 411/342 |
| 2,908,196 | 10/1959 | Apfelzeweig . |
| 3,244,056 | 4/1966 | Kern . |
| 3,248,994 | 5/1966 | Mortensen . |
| 3,288,014 | 11/1966 | Mortensen . |
| 3,473,431 | 10/1969 | King, Jr. . |
| 3,707,898 | 1/1973 | Holly ................. 411/344 |
| 3,797,866 | 3/1974 | Smulka . |
| 3,861,268 | 1/1975 | Jaggers . |
| 4,075,924 | 2/1978 | McSherry et al. . |
| 4,120,231 | 10/1978 | Neumayer . |
| 4,294,156 | 10/1981 | McSherry et al. . |
| 4,650,386 | 3/1987 | McSherry et al. . |
| 4,971,502 | 11/1990 | Oh . |
| 5,007,223 | 4/1991 | Holland .............. 411/344 |

FOREIGN PATENT DOCUMENTS 554416 7/1943 United Kingdom ............... 411/340

OTHER PUBLICATIONS

E-Z Toggle ™ Installation Instructions, ©1991, ITW Buildex, General Construction Systems, 1349 West Bryn Mawr Avenue, Itasca, Ill. 60143.

Primary Examiner—Neill R. Wilson
Attorney, Agent, or Firm—Nolte, Nolte and Hunter

[57] ABSTRACT

An anchor assembly for retaining an elongated fastener member within an opening defined by a support wall having at least one concealed side. At least two elongated wire-like legs are positioned in parallel relation and a threaded apertured anchor member is slidably movable along the wire-like leg members and adapted to assume a first position parallel to the legs when the legs are in a first orientation and a second position generally perpendicular to the legs when the position of the legs is rotated to a second position. A connecting member in the form of a collar is attached to the proximal ends of the legs and is configured and dimensioned for positioning within the opening of the support member. The collar defines an aperture dimensioned and configured for reception of the elongated fastener member to facilitate attachment of the elongated fastener member to the anchor member through the threaded aperture when the anchor member is positioned at the distal side of the support wall and has assumed said second position generally perpendicular to the legs. The collar assures alignment of the fastener member with the aperture of the anchor member.

45 Claims, 6 Drawing Sheets

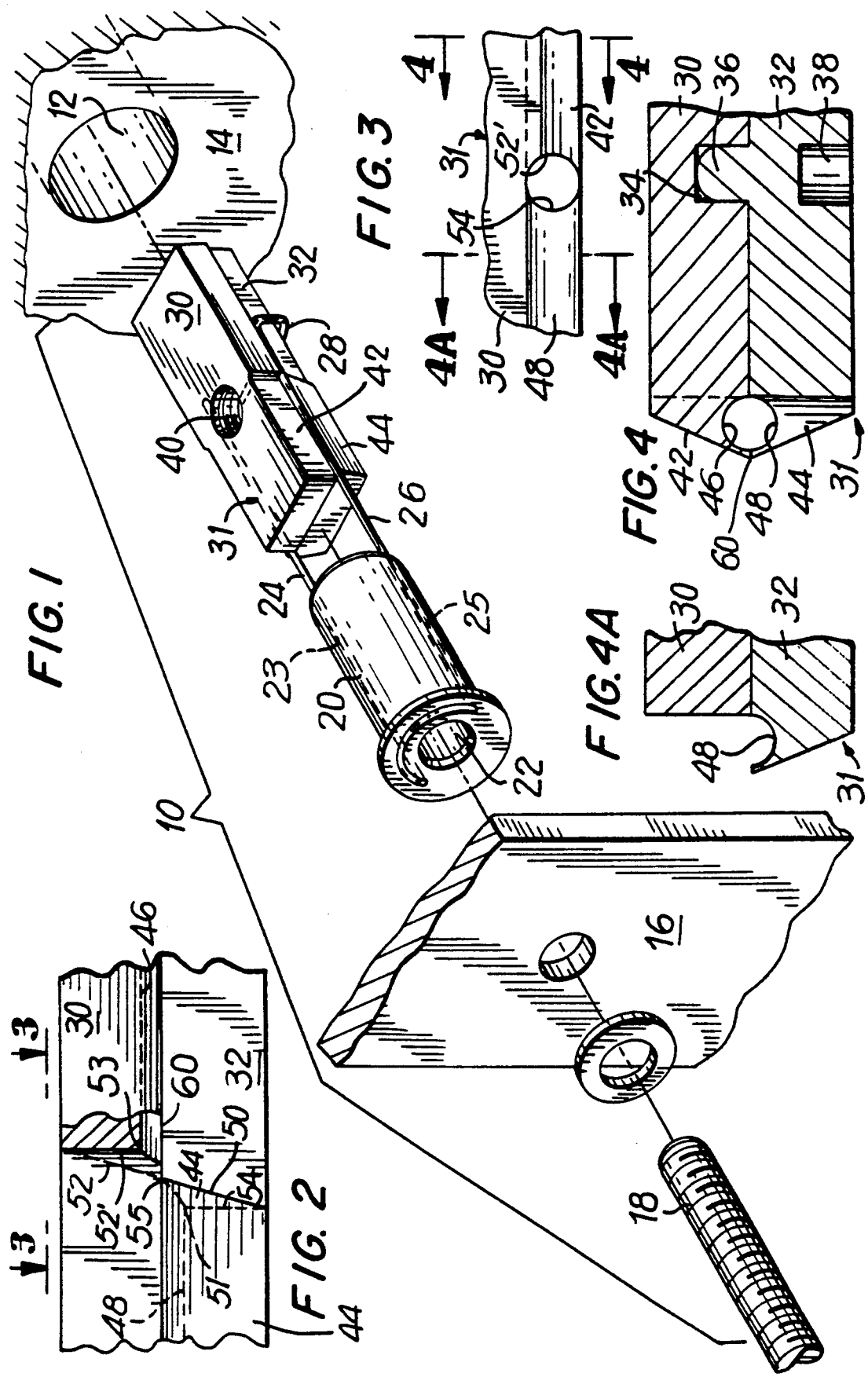

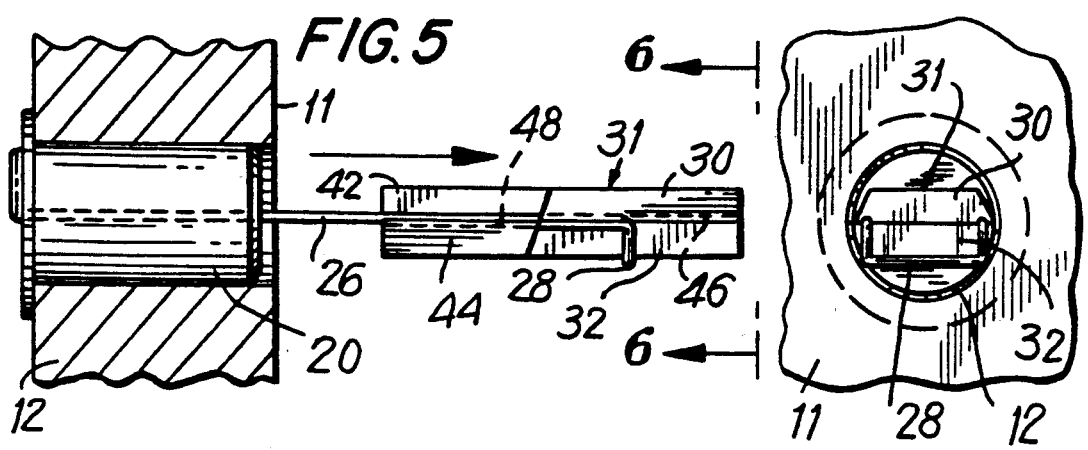
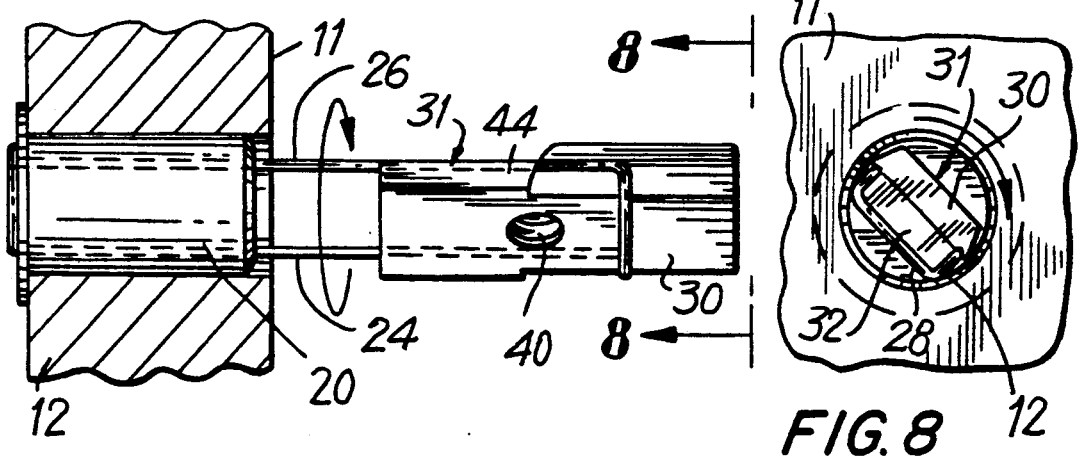
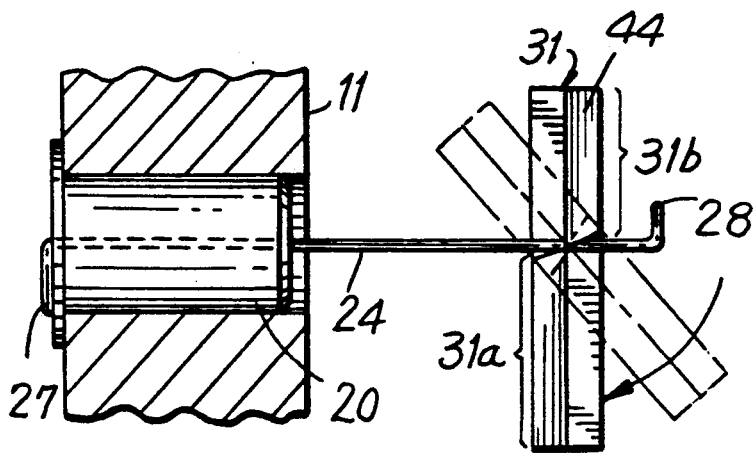

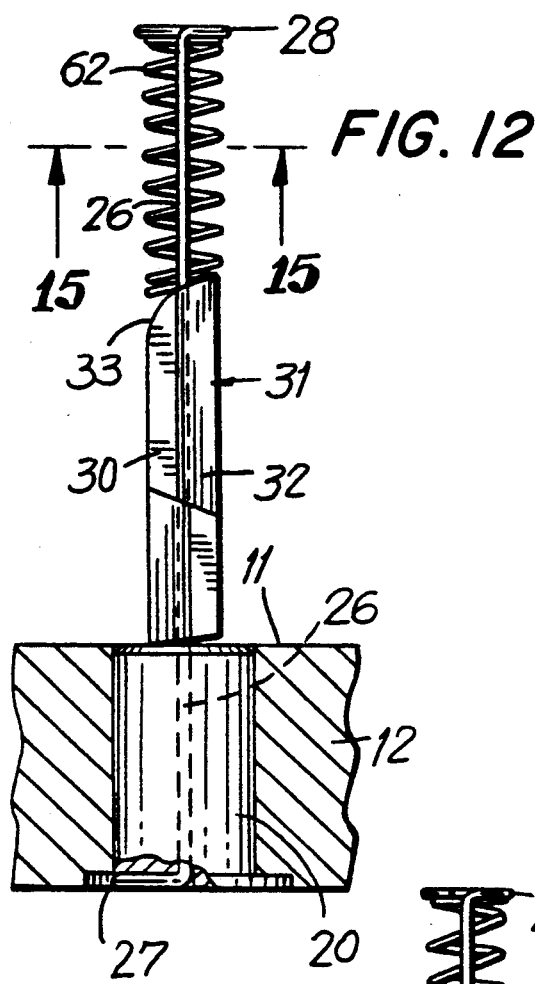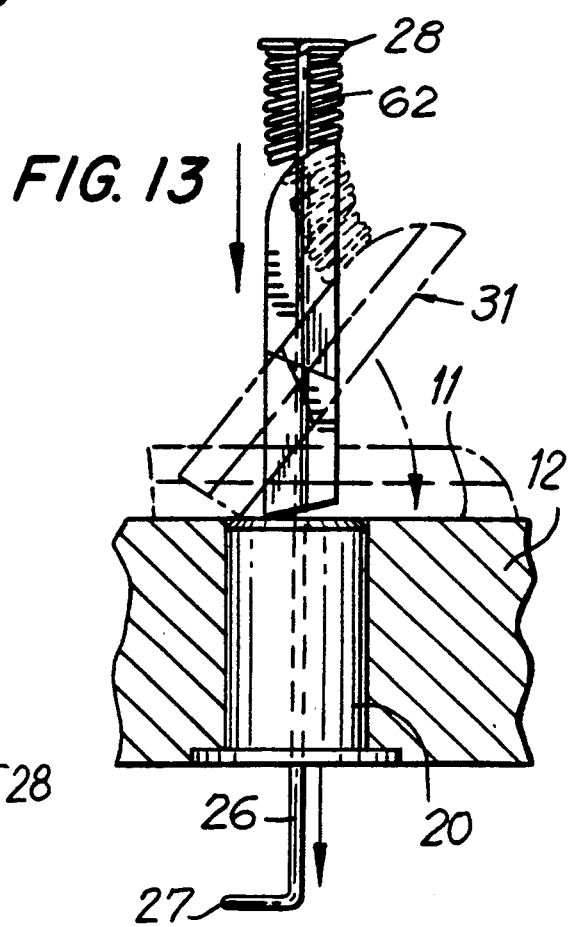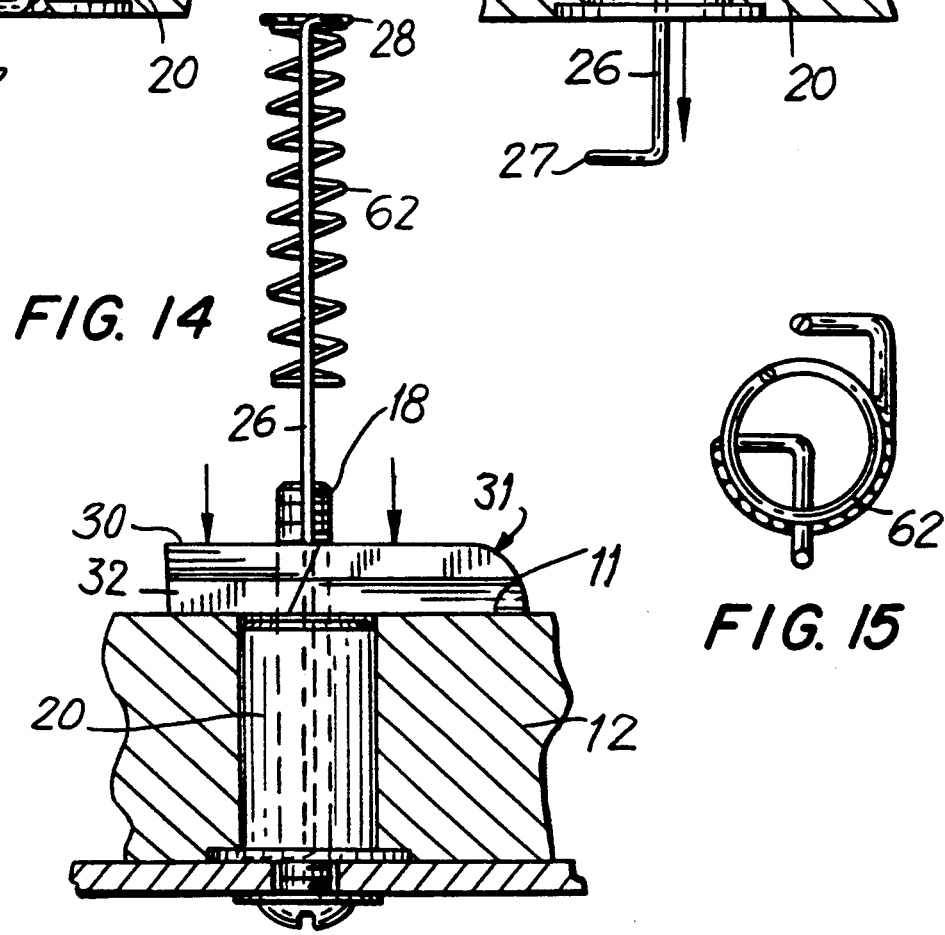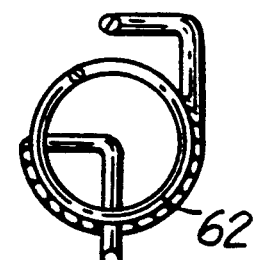

ANCHOR ASSEMBLY FOR FASTENER

BACKGROUND OF THE INVENTION

1. Field of the Invention

The present invention relates to anchoring devices for fastening objects to hollow walls. Walls of plasterboard, masonry, brick or the like are contemplated wherein elongated fasteners such as bolts, screws, etc. may be attached for further attachment of a workpiece 2. Description of the Prior Art Numerous devices and systems are currently available for blind attachment of objects to hollow walls such as walls constructed of plasterboard, masonry, brick, and the like. In some instances the actual construction of structures such as buildings, towers, bridges or the like present instances where blind fastening is required, i.e. inserting a fastener in a support structure and providing an attachment device on the blind side.

Although the prior art is replete with devices and systems for inserting fastener reception devices behind a support member and for controlling the attachment medium such as a threaded nut, or the like, such devices do not provide the degree of blind control for the attachment device, coupled with strength requirements whereby all types of fastenings can be achieved.

U.S Pat. No. 4,075,924 to McSherry relates to anchor assembly for fasteners wherein control of an anchor member is facilitated by a pair of leg members to which the anchor member is attached.

U.S. Pat. No. 2,908,196 to Applezweig relates to a toggle bolt which incorporates a relatively complex system to facilitate blind attachment to a support wall. A toggle element is provided for engagement by a screw.

U.S. Pat. No. 2,398,720 to Gelpcke relates to a toggle lock which includes a pair of legs and a guide member with self-spreading arms.

As noted, numerous other devices are available wherein attachment of fasteners to the blind side of a wall structure can be achieved However, these devices often utilize complex arrangements to achieve the blind control, and such arrangements necessarily compromise the strength of the fastener system. For example, since the "nut" or other fastener reception component must first be inserted into an opening in the support structure, the dimensions of such fastener reception device will dictate the size of the wall opening Where relatively complex devices are utilized to achieve the gripping effect, i.e. spreadable arms, channels, etc., the wall opening must be large enough to receive such device. Ideally, a solid fastener reception device would maximize strength and minimize the dimensions of the wall opening thereby providing a fastening in the same manner as if full access to the blind side of the wall were available. The present invention is directed to an anchor assembly for fasteners which achieves these operatives.

SUMMARY OF THE INVENTION

An anchor assembly for retaining an elongated fastener member within an opening defined by a support member having at least one distal side which comprises at least two elongated leg members positioned in adjacent relation, and generally elongated anchor member movable along the leg members and adapted to assume a first position generally parallel to the leg members when the leg members are in a first orientation, and a second position generally transverse to the leg members when the position of the leg members is rotated to a second position.

Preferably, an anchor assembly is provided for retaining an elongated fastener member within an opening defined by a support member having at least one concealed side which comprises at least two elongated leg members positioned in generally parallel relation, an anchor member slidably movable along the leg members and adapted to assume a first position generally parallel to the leg members when the leg members are in a first orientation and a second position generally perpendicular to the leg members when the position of the leg members is rotated to a second position, and connecting means attached to the proximal ends of the leg members and configured and dimensioned for positioning within the opening of the support member. The connecting means defines an aperture dimensioned and configured for reception of the elongated fastener member to facilitate attachment of the elongated fastener member to the anchor member when the anchor member is positioned at the distal side of the support member and has assumed the second position generally perpendicular to the leg members.

Preferably, the anchor member defines a track in the form of a shoulder on each side for slidable reception and retention of each of the elongated leg members. The track is comprised of two portions, a first portion extending over a portion of the length of the anchor member and a second portion facing opposite the first portion and extending over the remaining portion of the length of the anchor member. Further, the anchor member is comprised of at least two component members attached to each other along a generally medial interfacial plane. Alternatively, the anchor may be integrally formed. Further, the leg members are wire-like members having an arcuate cross sectional configuration. Any configuration of the leg members and the shoulders is possible, provided the leg members are retained in movable position on the shoulders.

Each of the track portions on the anchor member have a generally arcuate cross section adapted to receive the wire-like leg members to slidably support the anchor member thereon. The anchor member is generally rectangular in shape and defines a threaded aperture for reception of the fastener member.

Further, the first track portion on each side of the anchor member is of length different from the second track portion on each side of the anchor member thereby defining a pivot axis for pivotal rotation of the anchor member. The center of gravity of the anchor member is spaced from the pivot axis such that the anchor member may pivotally rotate about said axis under influence of gravity. The threaded aperture in the anchor member is located at approximately the same location as the pivot axis.

The anchor member may be fabricated of steel or plastic Further, a collar member dimensioned and configured for entry into the opening in the support member is provided. The collar member defines a circular opening for reception of an elongated fastener member having a cross section similar to the circular opening and the wire-like leg members are slidably positioned within apertures defined by the collar member to permit the said leg members to be moved in distal and proximal directions relative to the collar member.

The leg members are preferably connected by a wire-like bridge at the proximal and distal ends. The wire-like bridge at the proximal end facilitates manually grasping the leg members and the wire-like bridge at the distal end being positioned to engage and advance the anchor member toward the concealed side of the support member for fastening. Also, the anchor member is comprised of two half portions which are assembled by interference fit. One of the half portions of the anchor member defines at least two apertures and the other half portion defines at least two projections positioned, dimensioned and configured for interference-fit reception into the apertures defined by the first half portion The apertures have a circular cross-sectional configuration and the projections have similar circular cross-sectional configurations.

In a preferred embodiment, an anchor assembly is provided for retaining an elongated threaded fastener member within an opening defined by a wall portion having at least one concealed side having at least two elongated leg members positioned in generally parallel positions, the leg members each having a generally circular cross section. An anchor member has a generally elongated configuration and is slidably supported on the leg members. The anchor member has a lengthwise dimension greater than the widthwise dimension and defines a shelf extending along each side thereof along a portion of the length. Each shelf has a generally circular cross section for slidably supporting one of the leg members, the anchor member having a similarly configured shelf extending along the remaining portions thereof along the same side and having a circular cross section and facing opposite the circular cross section of the first mentioned shelves for slidable reception of the leg members. The last mentioned shelf portions are greater in dimension than the first mentioned shelf portions and define a transverse pivotal axis at the joinder of the two portions such that the center of gravity of the anchor member is spaced from the pivotal axis such that when the leg members and the anchor member are in a first orientation the gravitational moment on the anchor member causes the anchor member to remain in a horizontal orientation by engagement of the first shelf portions with the leg members and when the leg members and the anchor member are rotated approximately 180° the gravitational moment on the anchor member causes the anchor member to pivotally rotate about the pivotal axis to an orientation generally perpendicular to the leg members. This anchor member may be inserted into the wall opening and oriented parallel to the leg members such that rotating the leg members and the anchor member approximately 180 directs the gravitational moment to cause the anchor member to pivotally rotate about the axis to an orientation substantially perpendicular to the leg members.

A collar member defines two apertures for slidable reception of the proximal end portions of the leg members and is configured and dimensioned for reception by the wall opening and defines an aperture for reception of the threaded fastener member. The anchor member further defines a threaded aperture for threaded reception of the fastener member. The threaded aperture is located relative to the pivot axis such that when the anchor member is caused to be oriented substantially perpendicular to the leg members, the threaded aperture is in general alignment with the aperture defined by the collar member. The elongated members are wire-like members having a generally circular cross section. The first mentioned shelf portions of the anchor member have a generally circular cross-sectional configuration and face a first direction and the second mentioned shelf portions have a generally circular cross-sectional configuration and face opposite the direction of the first mentioned shelves whereby the first and second mentioned shelves each form a circular track on each side of the anchor member for slidable reception of the wire-like elongated leg members.

In one embodiment, the anchor member has an adhesive member on one surface for adhesive attachment to the concealed side of the wall for positioning the threaded aperture of the anchor member in alignment with the wall aperture. The adhesive member is a double-sided adhesive tape member, the first side being adhesively attached to the surface of the anchor member, the second side being capable of adhesive attachment to the distal side of the wall to secure the anchor member against the concealed side of the wall prior to insertion of the fastener member.

In another embodiment the collar member includes two distally extending members positioned adjacent the leg members and having a plurality of stepped members. The surface on each side of the anchor member is dimensioned and configured for stepped engaged reception by the stepped members whereby orienting the anchor member generally perpendicular to said leg members and advancing the anchor member toward the collar member causes the side surfaces of the anchor member to progressively engage the stepped portions defined by the distally extending members whereby the stepped portions progressively retain the anchor member in position therealong until the anchor member engages the distal surface of the wall whereby the anchor member is retained in engagement therewith by the stepped portions. Preferably the distally extending members are integrally formed with said collar member. The collar member may be constructed of metal, plastic or any suitable material. Preferably, the stepped extensions are formed integrally with the collar member.

The anchor member is preferably comprised of two component half portions attached in face to face relation. The first component half portion has sloped side portions extending from one surface thereof toward positions outwardly therefrom to define a portion of the circular track on either side thereof and the second half portion contains sloped side surfaces oriented at an angle opposite the direction of the orientation of the sloped side surfaces of the other half portion whereby the second mentioned pair of circular shelves (or shoulders) are defined for reception of the leg members. The joinder between said first and second circular shelves defining a pivot axis of rotation for said anchor member. Further, the shelves need not be circular, but of any cross-section similar or equal to the cross-section of the legs to facilitate slidable movement and pivotal movement of the anchor member, provided the wire is retained, i.e. arcuate, "V" shaped, etc.

In another embodiment, resilient means is positioned and adapted to facilitate pivotal rotation of said anchor member to said second position generally transverse to said leg members. The resilient means is a resilient member positioned between the distal end of the leg members and the anchor member and engages the distal end of the anchor member when the anchor member is oriented generally parallel to the leg members. Preferably, the resilient means is a coil spring positioned between bent distal end portions of the leg members and the distal end portion of the anchor member to apply a force toward the anchor member, which force resiliently assists the gravitational movement to pivotally rotate toward the position generally transverse to the leg member when the leg members are rotated to the second position. In this embodiment the anchor member is arcuately configured to facilitate engagement and release thereof by said resilient spring when said anchor member is pivotally rotated to said second position.

BRIEF DESCRIPTION OF THE DRAWINGS

Preferred embodiments of the invention are described hereinbelow with reference to the drawings wherein:

FIG. 1 is a perspective view from above of the blind anchor assembly constructed according to the invention in position for insertion into an opening of a wall;

FIG. 2 is a side view partially cut away of the anchor member shown in FIG. 1 with the leg members removed;

FIG. 3 is a side elevational view with portions cut away, taken along lines 3—3 of FIG. 2;

FIG. 4 is a cross-sectional view taken along lines 4—4 of FIG. 3 illustrating a preferred method of assembling the half portions of the anchor member and further illustrating the anchor support shelf in the distal portion of the anchor member;

FIG. 4A is a cross-sectional view taken along lines 4A—4A of FIG. 3, illustrating the anchor support shelf in the proximal portion of the anchor member;

FIG. 5 is a side elevational view, partially in cross section, of the anchor assembly and wall shown in FIG. after the anchor member is inserted into the opening and the anchor member is on the concealed side of the wall;

FIG. 6 is a rear elevational view taken along lines 6—6 of FIG. 5 illustrating the anchor assembly shown in FIG. 5 after insertion into the wall opening;

FIG. 7 is a side elevational view, partially in cross section, of the anchor member and wall of FIG. 5 during rotation of the anchor assembly toward a position wherein the anchor member assumes a position perpendicular to the leg members;

FIG. 8 is a rear elevational view taken along lines 8—8 of FIG. 7 showing the concealed side of the wall and the position of the anchor member during the rotation procedure;

FIG. 9 is a side elevational view, partially in cross section, illustrating the anchor assembly as the anchor member assumes a position generally perpendicular to the leg members;

FIG. 12 is a view, partially in cross section, of an alternative embodiment of the invention wherein a resilient coil spring is positioned at the distal end of the leg members and engages one end of the anchor member to assist the anchor member in assuming a position generally perpendicular to the leg members for fastening;

FIG. 13 is a view, partially in cross section, of the alternative embodiment of FIG. 12 illustrating the anchor member in transit toward a position generally perpendicular to the leg members;

FIG. 14 is a view, partially in cross section, of the anchor assembly of FIG. 13 with a threaded fastener positioned within the collar member and threadedly attached to the anchor member securing the anchor member against the concealed side of the wall and a third member to the forward side of the wall;

FIG. 15 is a view taken along lines 15—15 of FIG. 12 illustrating part of the coil spring of the embodiment of FIG. 12;

DETAILED DESCRIPTION OF THE PREFERRED EMBODIMENTS

Figure 10:
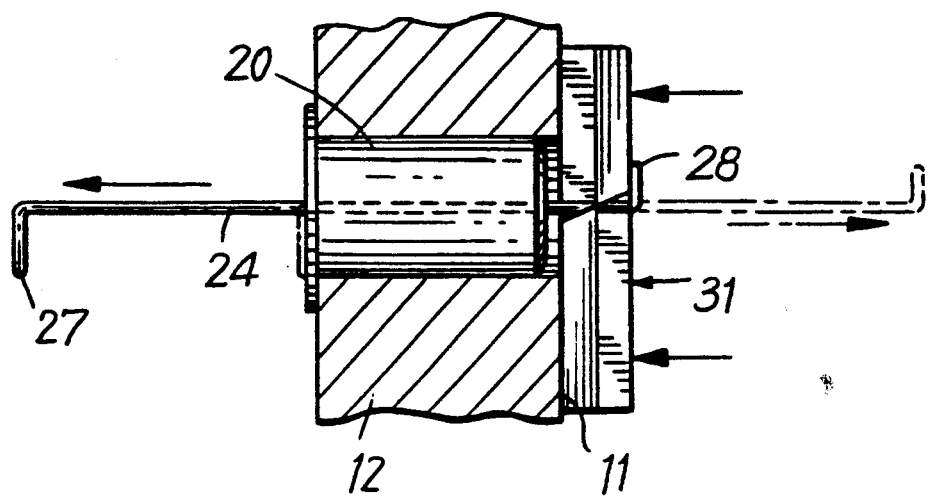
FIG. 10 is a side elevational view, partially in cross section, of the anchor assembly shown in FIG. 9 after the leg members and the anchor member have been withdrawn proximally until the anchor member is flush against the concealed side of the wall.

Referring initially to FIG. 1 a blind anchor assembly 10 constructed according to the present invention is shown in position prior to insertion into an opening 12 of a wall 14 having a concealed side. Ultimately, the anchor assembly will be attached to the wall and a third member 16 will be attached to the wall by a suitable threaded fastener 18, i.e. a bolt, as will be described.

Referring once again to FIG. 1, the anchor assembly includes collar 20 having an aperture 22 dimensioned and configured for relatively snug reception of the shank portion of the bolt 18. The collar member 20 is preferably constructed of a suitable material such as metal or plastic and includes a pair of elongated wire-like legs 24, 26 slidably positioned within apertures 23, 25 and extending distally through the collar 20. In the embodiment shown in FIG. 1 the wire-like legs are connected to each other by being continuous and having a bent connecting end 28 at the distal end as shown. However, the leg members may alternatively be disconnected from each other as will be seen in a later embodiment. The collar 20 and aperture 22 are configured to assure alignment between anchor member 31 and fastener 18 when the fastener is inserted into aperture 22 for threaded reception by the anchor member.

The anchor member 31 is preferably constructed of steel having an upper half 30, and a lower half 32 suitably attached to each other as shown in FIG. 4 wherein the upper half as an aperture 34 and the lower half has an extension peg 36 dimensioned, configured and positioned for interference fit reception into the aperture 34 of the upper half 30. The extension peg 36 is provided by known industrial techniques whereby material is punched from the opposite side of the member 34 to create an aperture 38 and the displaced material forms a precisely dimensioned peg 36 as shown in FIG. 4. Alternative methods of attaching the two half members of the anchor member may be utilized as being a welded as in FIG. 19, adhesives, or the like. Further, for lightweight applications, the anchor member may be constructed of a lighter material such as plastic, i.e. polypropylene, polyethylene, polycarbonate or the like. However, in such instances, it may be preferable to provide a weighted insert such as a metal insert in the portion of the anchor member which is intended to rotate under gravitational moment as will be described hereinbelow.

Referring once again to FIG. 1, the anchor member 31 includes a threaded aperture 40 appropriately dimensioned and threaded for threaded reception of the bolt 18 after the anchor member is positioned on the concealed side of the wall. Each of the half portions 30, 32 of the anchor member 31 respectively include respective opposed tapered sides 42, 44 shown in FIG. 4. The lower half portion 32 includes tapered sides 44 extending from the proximal end to the approximate location of threaded aperture 40 and the upper half portion 30 has oppositely shaped tapered sides 42 which extend from the approximate location of tapered aperture 40 to the distal end of the anchor member. The upper side surface 42 forms a shelf of circular cross section 46 on the upper half portion 30, and the lower side surface 44 forms a shelf 48 of similar circular cross section on the lower half 32 as shown in FIG. 4. The shelves of circular cross section 46, 48 are of the same radius and form a track of radius equal to or slightly larger than the radius of the wire legs 24, 26 on each side of the anchor member 31 to permit proximal and distal slidable movement of the anchor member 30 along the wire legs 24, 26 as will be seen in the description which follows.

Referring now to FIG. 2, further details of the circular shaped shelves 46, 48 are shown in the form of a side view of the anchor member 31 with portions cut away to illustrate the precise configuration of the shelves for reception of legs 24, 25 for slidably supporting the anchor member on the elongated wire leg members 24, 26. The upper half member 30 of the anchor member 31 has outwardly tapered sides 42 (one side shown in FIG. 4, but both sides are identical and opposite each defining circular underside downwardly facing shelf 4 for slidable movement of the anchor member along the wire legs 24, 26. The lower half member 32 of the anchor member 31 has tapered sides 44 defining the upwardly facing circular shelf 48.

Referring to FIG. 2, the outwardly extending tapered sides 44 on the lower member 32 are tapered at their distal ends as shown at 50 due to the intersection of circular shelf 48 with tapered side 44. This tapered end 50 also defines a circular vertical shelf 54 shown in dotted lines in FIG. 2 similar to the horizontal tapered shelf 48 shown in FIG. 4. Both shelves 48, 54 intersect at 55. Similarly, the upper portion 30 of the anchor member 31 has a tapered end 52 which defines a tapered circular vertical shelf 52' similar to the circular horizontal shelf 46, joining shelf 46 at intersection 53.

Referring once again to FIG. 2, tapered side 50 of the lower shelf terminates at 60, the point at which the tapered side 52 of the upper shelf begins. Thus, both tapered ends are in immediate adjacent relation to contain the wire legs 24, 25 to form a continuous circular track for the wire legs, i.e. one half circular track on the lower half and one half circular track on the upper half. Thus, the wire legs are prevented from moving transversely out of the tracks. Yet the anchor member 31 is permitted to pivotally rotate between the position shown in FIG. 1 and the transverse position shown in FIG. 9, utilizing the generally circular arcuate joinder as a pivot axis.

Referring once again to FIG. 1 the location of the aperture 40 is located at the position of the rotational pivot point 60 defined by the joinder between the tapered outer side walls 42 and 44 of the anchor member 31. Further, it can be seen that both the threaded aperture 40 and the rotational pivot point 60 are offset from the center of the length of the anchor member 31 to permit the anchor member to rotate under the action of gravity when the anchor member is slidably positioned at or near the distal ends of the leg members 24, 26 as will be described in connection with FIGS. 5, et seq. hereinbelow.

In operation when the anchor assembly is positioned as shown in FIG. 5 with the longer end of the anchor member 31 in the distal position the gravitational force acting on the center of gravity of the anchor member 31 will cause the anchor member to tend to rotate clockwise as shown in FIG. 5 until further rotation is prevented by the engagement of the circular shelves 46, 48 on each side of anchor member 31 with the elongated wire leg members 24, 26. When the anchor member is positioned at its distalmost location, shelves 48 engage the leg members and prevent pivotal rotation.

When the operator holds the collar member 20 firmly in hand the leg members 24, 26 are extended distally as shown in FIG. 5 and the anchor member will assume the horizontal orientation parallel to the leg members 24, 26 as shown in FIG. 5. In this position, with the anchor member 31 in the horizontal orientation the anchor member is simply inserted into the wall opening 12 until it clears the concealed side 11 of the wall 12. The relative positions of the anchor member 31 and the wall opening 12 are shown in the side view in FIG. 6 which is taken along lines 6—6 of FIG. 5. At this point, the operator rotates the entire anchor assembly by rotating the collar member 20 in either direction as shown in FIG. 7. In particular, in FIG. 7 as viewed by the operator the anchor assembly is rotated in the counterclockwise direction. However, rotation in the clockwise direction will produce the same result. As the anchor assembly is rotated as in FIG. 7, the shelves 48 rotate to a position above leg members 24, 26 and the gravitational force on the center of gravity on the anchor member 31 will produce a turning motion on the anchor member 31. This motion causes the anchor member to pivotally rotate about the pivot point 60 formed at the joinder between the horizontal and vertical circular shelves 48, 54 extending outwardly from the sides of the anchor member. The turning moment will act on the anchor member 31 to cause the anchor member to rotate to the position shown in FIG. 9 which is perpendicular to the elongated wire leg members 24,26 and parallel to the concealed side 11 of wall 14. Thus, the anchor member is now in position for movement in the proximal direction to a position in engagement with the concealed side 11 of wall 14. It will be appreciated that continued rotation of the fastener assembly past 180° from the position shown in FIG. 5 (i.e. back to the position shown in FIG. 5) will cause the gravitational moment on the anchor member to rotate the anchor member once again toward the horizontal position shown in FIG. 5. Finally, engagement of the circular shelves 48 with the leg members 24,26 will prevent further rotation of the anchor member 31 causing the anchor member to assume the horizontal position whereby the anchor assembly may be removed from the opening 12 in wall 14, if desired.

Figure 11:
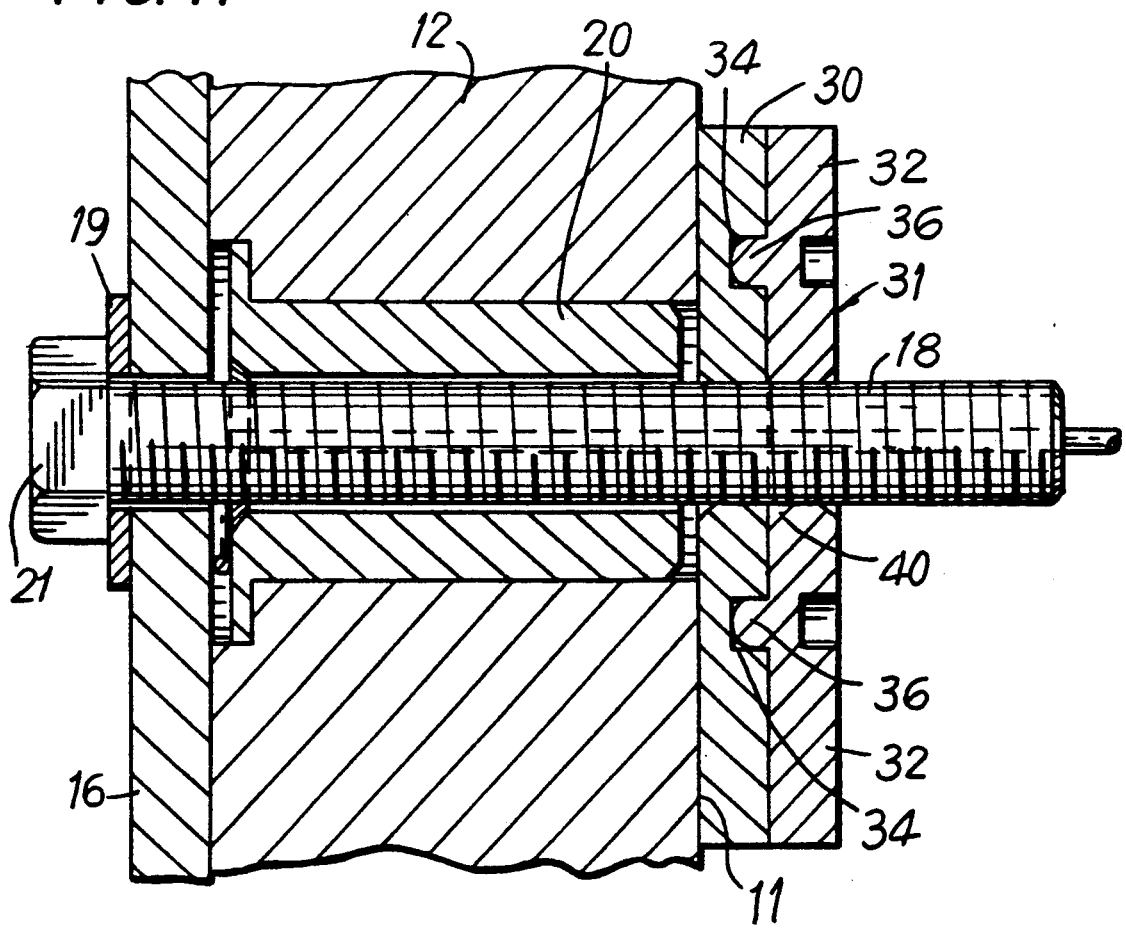
FIG. 11 is a cross sectional view of the anchor member in FIG. 10 with a threaded fastener member positioned in the collar and threadedly attached to the anchor member through the concealed side of the wall to secure a third member to the wall.

Referring now to FIG. 10, the continued operation of the anchor assembly will be described. The operator will grip the proximal end of leg members 24,26 where they are connected to form connecting loop 27. Thereafter, the connecting loop 27 is manually pulled in the proximal direction causing the distal connecting loop 28 to engage the anchor member 31 and to move it proximally until it is flush against the concealed surface 11 of wall 12. At this point threaded bolt 18 is inserted into the collar 20 and rotated to threadedly engage the anchor member 31 through the threaded opening 40. The bolt is tightened until the anchor member 31 is sufficiently tightened against the concealed side 11 of the wall 14. As shown in FIG. 11, a workpiece such as a plank 16 or other member is positioned against the wall and attached to the wall by the bolt 18 with optional washer 19 positioned between the head 21 of the bolt and the workpiece 16 depending upon the particular application or need. Any workpiece may be attached in any preferred manner.

It will be readily appreciated that the unique structure of the anchor member 31 is unique. The outwardly extending upper and lower shelves define a circular cross sectional track for the wire legs and also define a unique rotational pivot point at the joinder between the shelves on the lower half section of the anchor member and the shelves on the upper half section of the anchor member to support the anchor member on the leg members 24,26. This creates a unique arrangement whereby rotation of the anchor member to the operative position is accomplished relatively simply by rotation of the entire anchor assembly utilizing the gravitational forces and rotational moments produced thereby. Such structure produces substantial advantages over the prior art devices whereby numerous attempts have been made to produce a fastener whereby the operator may control the orientation of the blind anchor when it is located behind the concealed side of the wall from the unconcealed side.

Referring now to FIG. 11, the technique for attaching the upper half section 30 and the lower half section 32 to form the anchor member 31 is illustrated in further detail whereby pegs 36 in the lower half section 32 are attached by interference fit into apertures 34 in the upper half section 30. Thus, the lower half section may be produced out of commercial steel or molded of a suitable plastic material. The other half section may be similarly produced Thereafter, the two half sections are positioned in adjacent relation for assembly with the leg members 24,26 in the appropriate position in engagement with one of the circular configured side shelves (i.e., tracks). The half sections are positioned and joined together thus securing the anchor member for slidable movement along the leg members 24,26 and preventing removal of the leg members from the anchor member. The aperture 40 may then be threaded after the two half sections are assembled or alternatively each half section may be threaded prior to assembly whereby after assembly of the anchor member half sections 30, 32 and aperture 40 will be continuous.

The anchor member 31 may be completely assembled or integrally molded (i.e., plastic) prior to positioning of the leg members 24, 25. In such case, the leg members may be fabricated as separate members without bridge 28. Thus the leg members may be inserted into the circular apertures formed by tracks 46, 48 and thereafter bent in the form of pigtails 33 shown in FIG. 17. Optionally, other bent configurations, i.e. U-shaped, circular, etc. may be provided at the distal ends of the leg members 24, 25.

Referring now to FIG. 12 an alternative embodiment of the present invention is illustrated whereby the anchor member 31 has an arcuately configured surface 33 at the distal end and a coil spring 62 is positioned between the arcuate surface and the bent connector bridge 28 formed by the wire legs 24,26. The purpose of this configuration is to provide assistance in rotating the anchor member 31 to the position perpendicular to the leg members 24, 25 when the anchor assembly is rotated. It will be seen from FIG. 13 that as the anchor assembly is rotated as shown in FIG. 7 with the first embodiment, the gravitational moment will cause rotation of anchor member 31 toward the position perpendicular to the leg members and parallel to the concealed side 11 of wall 14. In addition, coil spring 62, which is in the compressed state as shown in FIG. 12, will assist the movement of the anchor member assisting the gravitational moment by providing an offset spring force which produces a turning moment on anchor member 31. FIG. 14 illustrates the anchor member 31 of the embodiment of FIG. 12 secured in position to the wall 12 with the workpiece 16 appropriately attached in position by fastener 18. FIG. 15 illustrates a partial cross sectional view of the compressed coil spring shown in FIG. 12.

Figure 16:
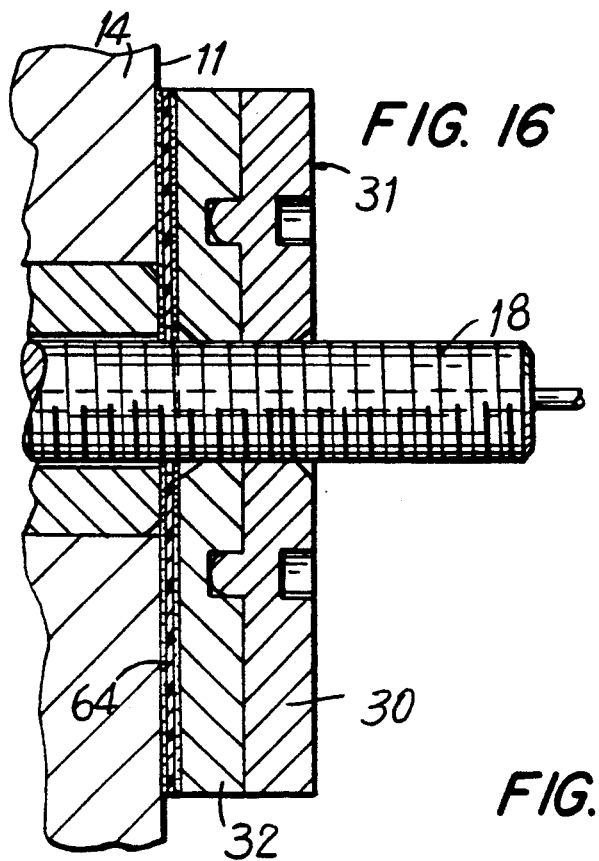
FIG. 16 is a view of an alternative embodiment of the invention illustrating the use of a double side adhesive member to preliminarily attach the anchor member to the concealed side of the wall during the fastening procedure.

Referring now to FIG. 16, there is shown still another embodiment of the invention whereby the anchor member 31 is provided with a double sided adhesive tape 64 on the side of the anchor member intended for secure engagement with the concealed surface 11 of the wall 12. The anchor member may be supplied by the manufacturer with the adhesive tape 64 attached to one side of the anchor member and the opposite side intended for attachment to the wall covered by release paper which is simply removed by the end user to activate the proximal adhesive side of the tape. Alternatively, the double adhesive sided tape may be supplied by the manufacture as a separate component with the release paper on both adhesive sides.

Figure 17:
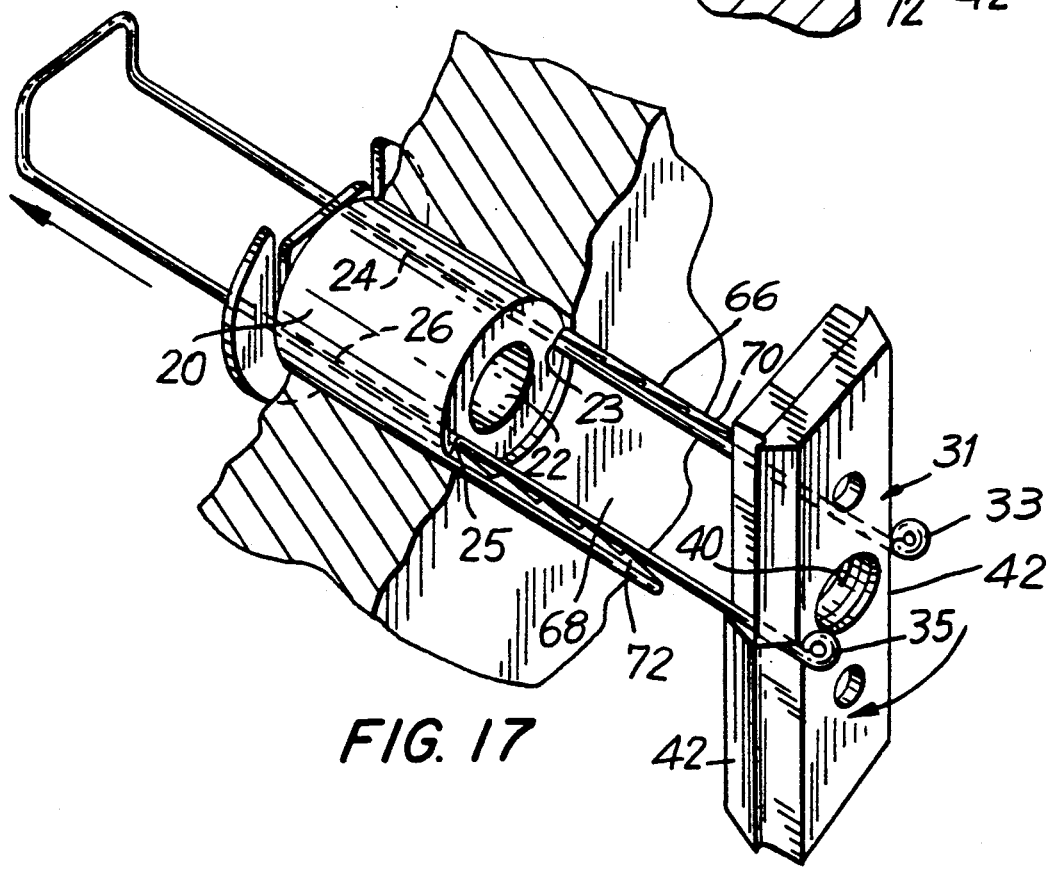
FIG. 17 is a perspective view of another alternative embodiment of the invention wherein a pair of extension members extend distally from the collar member and define a plurality of ratchet members to assist temporarily securing the position of the anchor member against the concealed side of the wall.

Referring now to FIG. 17 there is illustrated still another alternative embodiment of the invention. In this embodiment the collar 20 preferably includes distally extending leg members 68 which in turn define radially inwardly extending ratchet like steps 70, 72 respectively tapered outwardly in the distal direction as shown, for engagement with the outwardly tapered surfaces 42 on both sides of anchor member 31. The similar shape and dimension of the ratchet members 70, 72 are such that the wire legs 24,26 are pulled inwardly to advance the anchor member 31 inwardly toward the concealed side of wall 12 and a progressive ratchet engagement will take place between the ratchet steps 70, 72 of the extensions 66, 68. The outwardly extending tapered surfaces 42 of the anchor member 31 thereby progressively engage and secure the increasingly proximal position of the anchor member 31 until the anchor member 31 is firmly secured in position against the concealed side 11 of the wall 12 and retains the anchor member 31 firmly in that position by the last ratchet teeth 70, 72. At this point, the threaded aperture 40 of the anchor member 31 is in alignment with the aperture 12 in wall 14 to facilitate insertion of the threaded fastener 18 for threaded engagement with the threaded aperture 40. Extensions 66, 68 also serve to prevent rotation of the anchor member 31 as the bolt is threadedly engaged.

Figure 18:
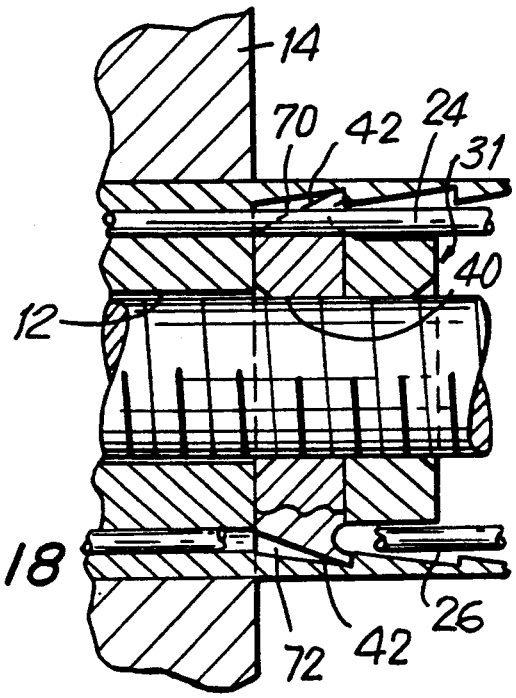
FIG. 18 is a cross sectional view of the alternative embodiment of FIG. 17 illustrating the engagement of the ratchet members with the anchor member to secure the anchor member in position flush against the concealed side of the wall.

It will be observed that the embodiment shown in FIGS. 17 and 18 the leg members 24, 26 are alternatively configured whereby the connector loop 28 at the distal end of legs 24, 26 has been eliminated and replaced by pigtails 33, 35 at the distal end of each leg member 24, 26 respectively. The leg members in the embodiment of FIGS. 17 and 18 are slidably positioned within apertures 23 as in the embodiment shown in FIG. 1. In FIG. 17, the leg members 24, 25 and apertures 23, 25 are positioned radially inward on the collar 20 to accommodate the radially outward position of the extensions 66, 68. In all other respects, the anchor assembly shown in FIGS. 17, 18 are identical to the anchor assembly shown in FIG. 1. Further, as in the embodiment of FIG. 1, the collar 20 may be of metal, molded plastic, or other suitable material.

Figure 19:
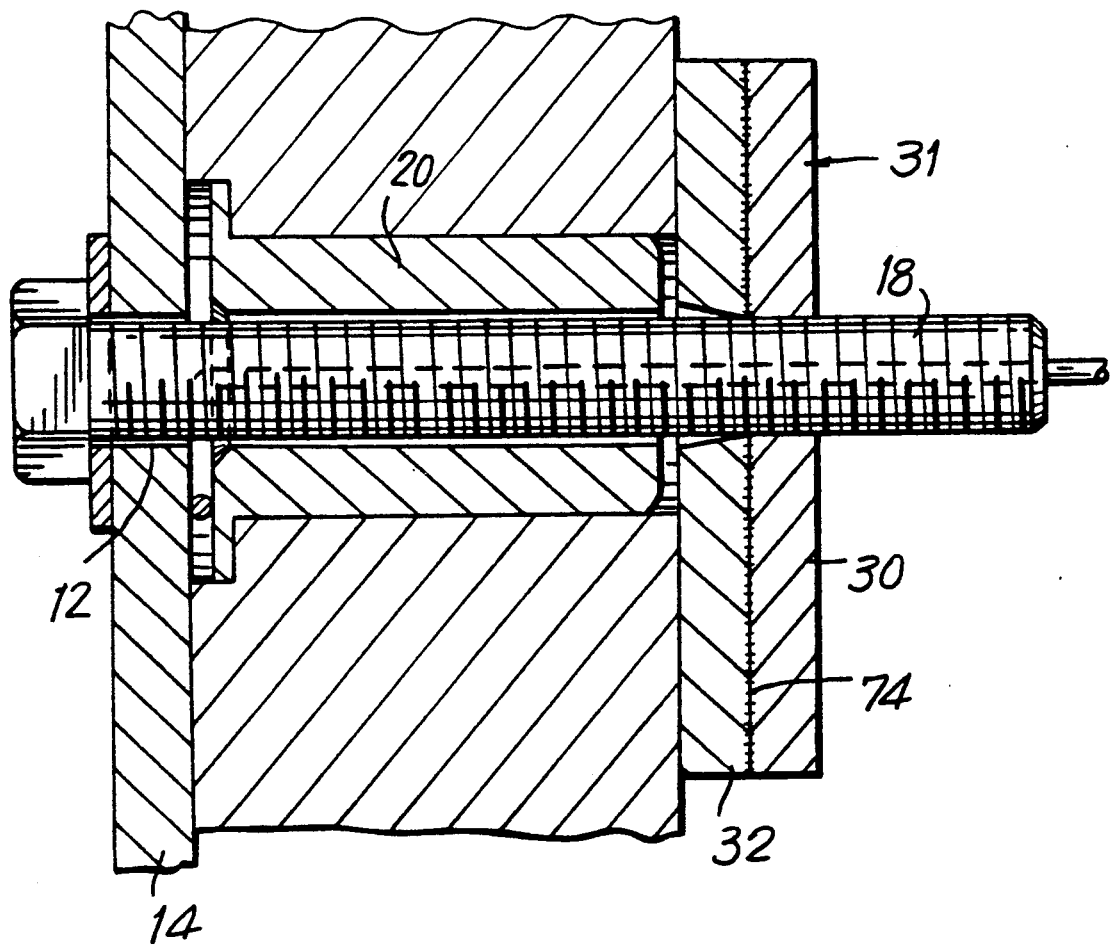
FIG. 19 is a cross sectional view of the blind anchor assembly of the present invention illustrating an alternative embodiment for attaching the half portions of the anchor member.

Referring now to FIG. 19, there is illustrated still another alternative embodiment of the invention wherein the anchor member 31 is formed by attaching half section 30 to half section 32 by a weld 74. Other suitable means of attaching the half members will come to the mind of the skilled artisan. In particular, the attachment means of the half members 30, 32 will in part be determined by the material with which the anchor member is formed. For example, the anchor member may be formed of steel for heavier and commercial applications in which case the attachment technique of the half sections illustrated in FIGS. 4, 16 and 19 will be appropriate. Additionally, steel half sections may be attached by adhesives. If the anchor member is constructed of molded plastic material such as polyethylene, polypropylene, polyester, polycarbonate, or the like, the half sections of the anchor member may be attached by adhesives or the ultrasonic welding techniques. A plastic anchor member may be integrally molded in one unit. Further, a weighted insert in the heavier portion of a plastic anchor member may be desirable to assist the gravitational moment.

In general, the strength of the attachment of the half sections of the anchor member 31 will not be significant once the half sections are attached and the threaded fastener 18 is threadedly engaged with the assembled anchor member 31, since both half sections will essentially be compressed together by the threads of the fastener member and the inward force on the anchor assembly.

The advantages of the present anchor assembly will be readily apparent to persons skilled in the art. Some of the advantages which readily come to mind are as follows. The solid construction of the anchor member facilitates fabrication of a high strength anchor member and provides substantially increased fastener force capability as opposed to such anchor members in the prior art which utilized channel members, threaded nuts, plates, or the like. In addition, the solid configuration of the anchor member and the substantial fastener force capability does not require greater dimensions as otherwise would have been applicable in the prior art. Thus, the widthwise dimension of the anchor member may be extremely close to the size of the aperture in the wall, thus making it possible to maximize the size of the threaded fastener in comparison to the size of the wall opening. For example, in prior art anchor assemblies utilizing such anchor members such as threaded fasteners, threaded nuts or the like, a typical anchor member would be capable of carrying a force of 1,200 pounds with the maximum size opening, i.e. greater than one half inch. An example of the present anchor assembly utilizing a solid anchor member 31 which accepts a ⅜ size bolt will carry a force of approximately 10,500 pounds. An anchor member which accepts a one-half inch size bolt will carry a force of approximately 11,200 pounds. Further the strength may vary even greater by changing the material with which the anchor member is fabricated.

It will be clear to persons skilled in the art that the utilization of a solid fastener will minimize the size of the anchor member and will therefore minimize the size of the wall opening and will minimizing the size of the threaded fastener with greater force carrying capability of the anchor assembly. Such solid anchor members could not be utilized in the manner disclosed herein due to the difficulties involved in facilitating control of the position of the anchor member behind the concealed side of the wall. The present invention makes such control possible and therefore makes it possible to significantly increase the force carrying capability of the anchor assembly.

We claim:

1. An anchor assembly for retaining an elongated fastener member within an opening defined by a support member having at least one concealed side which comprises:
   a) at least two elongated leg members positioned in generally parallel relation;
   b) an anchor member slidably movable along said leg members and adapted to assume a first position generally parallel to said leg members when said leg members are in a first orientation and a second position generally perpendicular to said leg members when the position of said leg members is rotated to a second position;
   c) connecting means attached to the proximal ends of said le members and configured and dimensioned for positioned within the opening of the support member, said connecting means defining an aperture dimensioned and configured for reception of the elongated fastener member to facilitate attachment of the elongated fastener member to said anchor member when said anchor member is positioned at the distal side of the support member and has assumed said second position generally perpendicular to said leg members;
   d) said anchor member defining a track on each side for slidable reception of each said elongated leg members.

2. The anchor assembly according to claim 1 wherein each said track is comprised of two portions, a first portion extending over a portion of the length of said anchor member and a second portion facing opposite said first portion and extending over the remaining portion of the length of said anchor member.

3. The anchor assembly according to claim 2 wherein said anchor member is comprised of at least two component members attached to each other.

4. The anchor assembly according to claim 3 wherein said component members of said anchor member are attached to each other along a generally medial interfacial plane.

5. The anchor assembly according to claim 4 wherein said leg members are wire-like members having an arcuate cross sectional configuration.

6. The anchor assembly according to claim 5 wherein each said track portions on said anchor member have a generally arcuate cross section adapted to receive said wire-like leg members to slidably support said anchor member thereon.

7. The anchor assembly according to claim 6 wherein said anchor member is generally rectangular in shape.

8. The anchor assembly according to claim 7 wherein said anchor member defines an aperture for reception of the fastener member.

9. The anchor assembly according to claim 8 wherein said aperture in said anchor member is threaded for reception of a threaded fastener member.

10. The anchor assembly according to claim 9 wherein said first track portion on each side of said anchor member is of length different from said second track portion on each side of said anchor member thereby defining a pivot axis for pivotal rotation of said anchor member, the center of gravity of said anchor member being spaced from said pivot axis such that said anchor member may pivotally rotate about said axis under influence of gravity.

11. The anchor assembly according to claim 10 wherein said threaded aperture in said anchor member is located at approximately the same location as said pivot axis.

12. The anchor assembly according to claim 11 Wherein said anchor member is fabricated of at least one of steel and plastic.

13. The anchor assembly according to claim 12 wherein said connecting means is a collar member dimensioned and configured for entry into the opening in the support member.

14. The anchor assembly according to claim 13 wherein said collar member defines a circular opening for reception of an elongated fastener member having a cross section similar to said circular opening.

15. The anchor assembly according to claim 14 wherein said wire-like leg members are slidably positioned within apertures defined by said collar member to permit said leg members to be moved in distal and proximal directions.

16. The anchor assembly according to claim 15 wherein said leg members are connected by a wire-like bridge at the proximal and distal ends, said wire-like bridge at the proximal end facilitating manually grasping said leg members and said wire-like bridge at said distal end being positioned to engage and advance said anchor member toward the concealed side of the support member for fastening.

17. The anchor assembly according to claim 16 wherein said anchor member is comprised of two half portions which are assembled by interference fit.

18. The anchor assembly according to claim 17 wherein one of said half portions of said anchor member defines at least two apertures and the other half portion defines at least two projections positioned, dimensioned and configured for interference-fit reception into said apertures defined by said first half portion.

19. The anchor assembly according to claim 18 wherein said apertures have a circular cross-sectional configuration and said projections have similar circular cross-sectional configurations.

20. An anchor assembly for retaining an elongated threaded fastener member within an opening defined by a wall portion having at least one concealed side which comprises:

a) at least two elongated leg members positioned in generally parallel position, said leg members each having a generally circular cross section;

b) an anchor member having a generally elongated configuration and slidably supported on said leg members;

c) said anchor member having a lengthwise dimension greater than the widthwise dimension and defining a shelf extending along each side thereof along a portion of the length, each shelf having a generally circular cross section for slidably supporting one of said leg members, said anchor member having a similarly configured shelf extending along the remaining portions thereof along the same side and having a circular cross section and facing opposite the circular cross section of said first mentioned shelves for slidable reception of said leg members, said last mentioned shelf portions being greater in dimension than said first mentioned shelf portions and defining a transverse pivotal axis at the joinder of the two portions such that the center of gravity of said anchor member is spaced from said pivotal axis such that when said leg members and said anchor member are in a first orientation the gravitational moment on said anchor member causes said anchor member to remain in a horizontal orientation by engagement of said first shelf portions with said leg members and when said leg members and said anchor member are rotated approximately 180° the gravitational moment on said anchor member causes said anchor member to pivotally rotate about said pivotal axis to an orientation generally perpendicular to said le members whereby said anchor member may be inserted into the wall opening and oriented parallel to said leg members and rotating said leg members and said anchor member approximately 180° directs the gravitational moment to cause said anchor member to pivotally rotate about said axis to an orientation substantially perpendicular to said leg members; and d) a collar member defining two apertures for slidable reception of the proximal end portions of said leg members, said collar being configured and dimensioned for reception by the wall opening and defining an aperture for reception of the threaded fastener member;

said anchor member further defining a threaded aperture for threaded reception of the fastener member, said threaded aperture being located relative to said pivot axis such that when said anchor member is caused to be oriented substantially perpendicular to said leg members, said threaded aperture is in general alignment with said aperture defined by said collar member.

21. The anchor assembly according to claim 20 wherein said elongated members are wire-like members having a generally ,circular cross section.

22. The anchor assembly according to claim 21 wherein each said first mentioned shelf portions have a generally circular cross sectional configuration and face a first direction and said second mentioned shelf portions have a generally circular cross sectional configuration and face opposite the direction of said first mentioned shelves whereby said first and second mentioned shelves each form a circular track on each side of said anchor member for slidable reception of said wire-like elongated leg members.

23. The anchor assembly according to claim 22 wherein said anchor member has an adhesive member on one surface for adhesive attachment to the concealed side of the wall for positioning said threaded aperture of said anchor member in alignment with the wall aperture.

24. The anchor assembly according to claim 23 wherein said adhesive member is a double-sided adhesive tape member, the first side being adhesively attached to said surface of said anchor member, the second side being capable of adhesive attachment to the distal side of the wall.

25. The anchor assembly according to claim 24 wherein sa collar member includes two distally extending members positioned adjacent said leg members and having a plurality of stepped members and said anchor member has a surface on each side which is dimensioned and configured for stepped engaged reception by said stepped members whereby orienting said anchor member generally perpendicular to said leg members and advancing said anchor member toward said collar member causes said side surfaces of said anchor member to progressively engage said stepped portions defined by said distally extending members whereby said stepped portions progressively retain said anchor member in position therealong until said anchor member engages the distal surface of the wall whereby said anchor member is retained in engagement therewith by said stepped portions.

26. The anchor assembly according to claim 26 wherein said distally extending members are integrally formed with said collar member.

27. The anchor assembly according to claim 28. wherein said anchor member is comprised of two component half portions attached in face to face relation, the first component half portion having sloped side portions extending from one surface thereof toward positions outwardly therefrom to define a portion of said circular track on either side thereof and the second half portion contains sloped side surfaces oriented at an angle opposite the direction of the orientation of said sloped side surfaces of said other half portion whereby said second mentioned pair of circular shelves are defined for reception of said leg members, the joinder between said first and second circular shelves defining a pivot axis of rotation for said anchor member.

28. An anchor assembly for retaining an elongated fastener member within an opening defied by a support member having at least one distal side which comprises:
    a) at least two elongated leg members positioned in adjacent relation;
    b) a generally elongated anchor member movable along said leg members and adapted to assume a first position generally parallel to said leg members when said leg members are in a first orientation and a second position generally transverse to said leg members when the position of said leg members is rotated to a second position;
    c) resilient means positioned and adapted to facilitate pivotal rotation of said anchor member to said second position generally transverse to said leg members;
    (d) said resilient means being a resilient member positioned between the distal end of said leg members and said anchor member.

29. The anchor assembly according to claim 28 wherein said resilient means engages the distal end of said anchor member when said anchor member is oriented generally parallel to said leg members.

30. The anchor assembly according to claim 29 wherein said resilient means is a coil spring positioned between bent distal end portions of said leg members and the distal end portion of said anchor member to apply a force toward said anchor member, which force resiliently assists said anchor to pivotally rotate toward the position generally transverse to said leg member when said leg members are rotated to said second position.

31. An anchor assembly for retaining an elongated fastener member within an opening defined by a support member having at least one concealed side which comprises:
    a) at least two elongated leg members positioned in generally parallel relation;
    b) an anchor member slidably movable along said leg members and adapted to pivotally rotate under the influence of gravity to assume a first position generally parallel to said leg members when said leg members are in a first orientation and a second position generally perpendicular to said leg members when the position of said leg members is rotated to a second position;
    c) connecting means attached to the proximal ends of said leg members and configured and dimensioned for positioning within the opening of the support member, said connecting means defining an aperture dimensioned and configured for reception of the elongated fastener member to facilitate attachment of the elongated fastener member to said anchor member when said anchor member is positioned at the distal side of the support member and has assumed said second position generally perpendicular to said leg members; and
    d) resilient spring means positioned between the distal end of said leg members and the distal end of said anchor member when said anchor member is in said first position, said spring means applying resilient force to said anchor member to assist said anchor member to pivotally rotate to said second position wherein said anchor member is pivoted by gravitational moment.

32. The anchor assembly according to claim 31 wherein said distal end of said anchor member is configured to facilitate engagement and release thereof by said resilient spring when said anchor member is pivotally rotated to said second position.

33. The anchor assembly according to claim 32 wherein distal end of said anchor member is arcuately configured.

34. The anchor assembly according to claim 1 wherein collar means is positioned at the proximal end portions of said leg members, said collar means being configured and dimensioned to be positioned within the opening of the support means.

35. The anchor assembly according to claim 34 wherein said collar means defines an aperture for reception of the fastener member.

36. The anchor assembly according to claim 35 wherein said leg members are in parallel relation.

37. The anchor assembly according to claim 36 wherein said leg members have a wire-like configuration.

38. The anchor assembly according to claim 37 wherein said anchor member is slidably movable along said leg members between proximal and distal positions.

39. The anchor assembly according to claim 38 wherein said anchor member includes at least one shelf on each side, said shelf dimensioned and configured to slidably support said anchor member on said wire-like leg members.

40. The anchor assembly according to claim 39 wherein said anchor member comprises means for attaching the fastener member thereto.

41. The anchor assembly according to claim 40 wherein said attachment means in said anchor means is an aperture.

42. The anchor assembly according to claim 41 wherein said aperture is threaded and the fastener member is elongated and threaded to facilitate threaded engagement with said anchor member.

43. The anchor assembly according to claim 1 wherein:
said anchor member defines apertures for reception of said leg members to movably support said anchor member on said leg members.

44. Anchor assembly according to claim 43 wherein:
said anchor member defines at least two apertures dimensioned and configured for respective reception of each said leg member.

45. A method of positioning an anchor assembly for retaining an elongated fastener member within an opening defined by support means having at least one distal side comprising:
a) taking at least two elongated leg members slidably secured at proximal ends thereof within a collar and positioned in adjacent relation and having an anchor member movably supported on said leg members for movement between proximal and distal positions, said anchor member being pivotal to positions between a first position generally in alignment with said leg members and a second position generally transverse to said leg members;
b) orienting said anchor member in said first position generally parallel to said leg members;
c) inserting said anchor member and at least a portion of said leg members into the opening sufficient such that said anchor member at least clears the distal side of the support member; and
d) rotating said collar to cause said anchor member to be pivoted to a second position such that said anchor member is generally parallel to the distal side of the support member.

* * * * *